(12) United States Patent
Imada

(10) Patent No.: US 9,562,157 B2
(45) Date of Patent: Feb. 7, 2017

(54) RESIN COMPOSITION AND RESIN MOLDED ARTICLE

(71) Applicant: FUJI XEROX CO., LTD., Tokyo (JP)

(72) Inventor: Akira Imada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/703,141

(22) Filed: May 4, 2015

(65) Prior Publication Data

US 2016/0185957 A1    Jun. 30, 2016

(30) Foreign Application Priority Data

Dec. 29, 2014   (JP) .................................. 2014-267004

(51) Int. Cl.
   *C08G 59/00*   (2006.01)
   *C08L 69/00*   (2006.01)

(52) U.S. Cl.
   CPC ..................................... *C08L 69/00* (2013.01)

(58) Field of Classification Search
   CPC ................................................. C08L 69/00
   USPC .................................. 523/452, 451; 525/438
   See application file for complete search history.

(56) References Cited

U.S. PATENT DOCUMENTS

2006/0264599 A1* 11/2006 Anno ................. B29C 45/0001
                                                    528/272
2010/0069543 A1*  3/2010 Monden .................. C08K 5/42
                                                    524/161
2011/0229673 A1    9/2011 Kurachi et al.
2013/0237644 A1    9/2013 Xin et al.
2013/0317150 A1* 11/2013 Wan ....................... C08L 67/02
                                                    524/127
2014/0296383 A1   10/2014 Xin et al.

FOREIGN PATENT DOCUMENTS

JP    S60-130645 A    7/1985
JP    H11-116782 A    4/1999
(Continued)

OTHER PUBLICATIONS

Nov. 7, 2016 Office Action issued in Japanese Patent Application No. 2014-267004.

*Primary Examiner* — David Karst
(74) *Attorney, Agent, or Firm* — Oliff PLC

(57) ABSTRACT

A resin composition includes a polycarbonate resin, a polyethylene terephthalate resin, a glycidyl group-containing polyethylene copolymer, an organic phosphorus flame retardant, and a flame retardant antidrip agent, wherein the polycarbonate resin and the polyethylene terephthalate resin are contained in a specific content range, and wherein the glycidyl group-containing polyethylene copolymer is a polyethylene copolymer which is constituted with a glycidyl group-containing (meth) acrylic acid ester unit and an ethylene unit, in which a content of the glycidyl group-containing (meth) acrylic acid ester unit in the glycidyl group-containing polyethylene copolymer is in a range of 2% by weight to 20% by weight, and has a glass transition point of 0° C. or lower, or is a copolymer obtained by performing graft polymerization of a polymerizable vinyl monomer onto a main chain of the polyethylene copolymer constituted with a glycidyl group-containing (meth) acrylic acid ester unit and an ethylene unit.

14 Claims, 1 Drawing Sheet

(56) References Cited

FOREIGN PATENT DOCUMENTS

| | | |
|---|---|---|
| JP | 2002-086553 A | 3/2002 |
| JP | 2011-148851 A | 8/2011 |
| JP | 2011-195654 A | 10/2011 |
| JP | 2012-077241 A | 4/2012 |
| JP | 2013-147651 A | 8/2013 |
| WO | 2013/111846 A1 | 8/2013 |

* cited by examiner

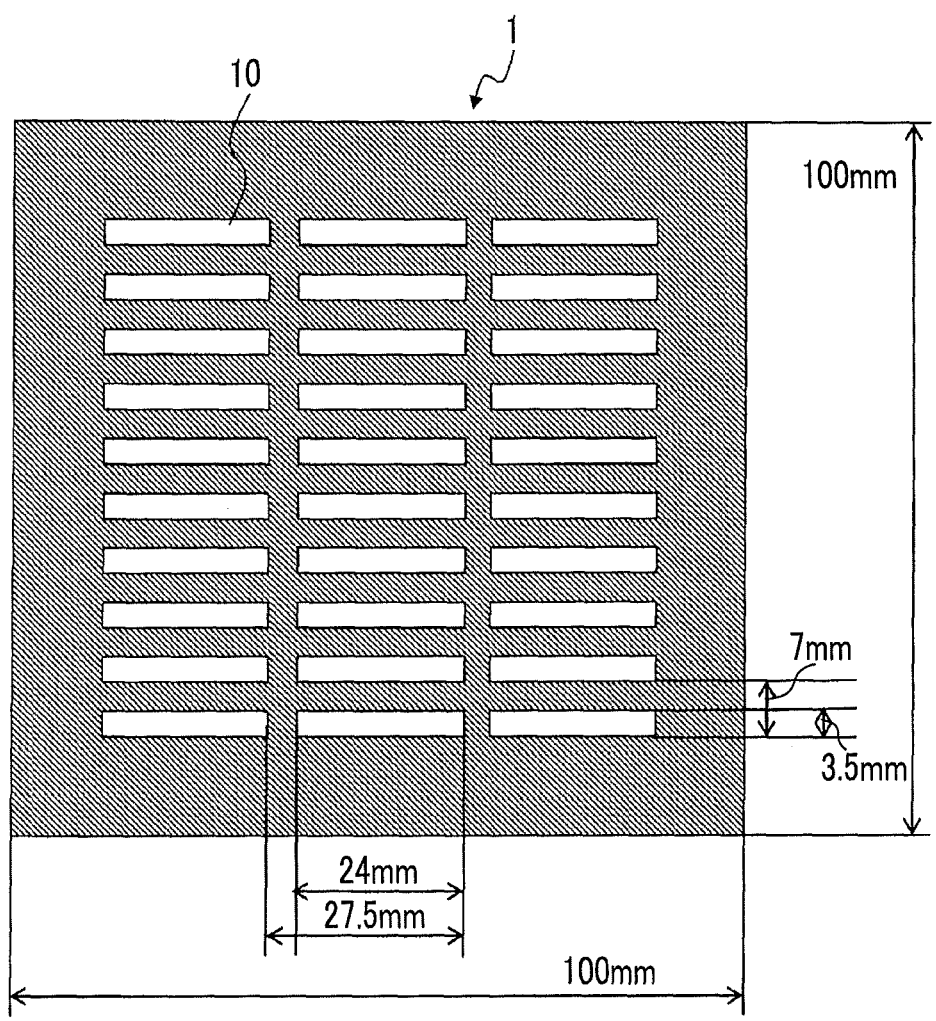

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-267004 filed Dec. 29, 2014.

BACKGROUND

Technical Field

The invention relates to a resin composition and a resin molded article.

In the related art, various resin compositions are provided to be used for various applications. For example, the resin compositions are used in resin molded articles such as various housings and components of home appliances or automobiles, or used in resin molded articles such as housings of business machines and electric and electronic apparatuses.

A polycarbonate resin is a thermoplastic resin having excellent impact resistance, heat resistance, and the like, and is widely used as a resin molded article such as a component and a housing in the field of machines, automobiles, electric equipment, and electronic equipment, and the like. Furthermore, the polyethylene terephthalate resin is a resin exhibiting good molding fluidity.

Recently, reduction in thickness of a resin molded article obtainable from the resin composition is advanced, and the enhancement of the flame retardance and the surface impact strength of the resin molded article obtainable from the resin composition containing the polycarbonate resin and the polyethylene terephthalate resin is required.

SUMMARY

According to an aspect of the invention, there is provided a resin composition including:
a polycarbonate resin;
a polyethylene terephthalate resin;
a glycidyl group-containing polyethylene copolymer;
an organic phosphorus flame retardant; and
a flame retardant antidrip agent,
wherein a content of the polycarbonate resin is in a range of 60% by weight to 90% by weight and a content of the polyethylene terephthalate resin is in a range of 10% by weight to 40% by weight, with respect to a total amount of the polycarbonate resin and the polyethylene terephthalate resin, and
wherein the glycidyl group-containing polyethylene copolymer is a polyethylene copolymer which is constituted with a glycidyl group-containing (meth) acrylic acid ester unit and an ethylene unit, in which a content of the glycidyl group-containing (meth) acrylic acid ester unit in the glycidyl group-containing polyethylene copolymer is in a range of 2% by weight to 20% by weight, and has a glass transition point of 0° C. or lower, or is a copolymer obtained by performing graft polymerization of a polymerizable vinyl monomer onto a main chain of the polyethylene copolymer constituted with a glycidyl group-containing (meth) acrylic acid ester unit and an ethylene unit.

BRIEF DESCRIPTION OF THE DRAWING

Exemplary embodiments of the present invention will be described in detail based on the following FIGURE, wherein:

FIG. 1 is a plan view schematically illustrating a test piece used in a louver portion strength test.

DETAILED DESCRIPTION

An exemplary embodiment of the invention is described as follows. The exemplary embodiment is an example for realizing the invention, and the invention is not limited to the exemplary embodiment.

Resin Composition

The resin composition according to the exemplary embodiment is a resin composition containing a polycarbonate resin, a polyethylene terephthalate resin, a glycidyl group-containing polyethylene copolymer, an organic phosphorus flame retardant, and a flame retardant antidrip agent. Also, in the resin composition, with respect to the total amount of the polycarbonate resin and the polyethylene terephthalate resin, the content of the polycarbonate resin is in the range of 60% by weight to 90% by weight, and the content of the polyethylene terephthalate resin is in the range of 10% by weight to 40% by weight. In addition, the glycidyl group-containing polyethylene copolymer is a polyethylene copolymer which is constituted with a glycidyl group-containing (meth) acrylic acid ester unit and an ethylene unit, in which a content of the glycidyl group-containing (meth) acrylic acid ester unit in the glycidyl group-containing polyethylene copolymer is in a range of 2% by weight to 20% by weight, and which has a glass transition point of 0° C. or lower, or is a copolymer obtained by performing graft polymerization of a polymerizable vinyl monomer onto a main chain of the polyethylene copolymer constituted with a glycidyl group-containing (meth) acrylic acid ester unit and an ethylene unit.

Also, the resin composition according to the exemplary embodiment has enhanced surface impact strength and flame retardance of the obtainable resin molded articles, compared with a resin composition formed of a polycarbonate resin, a polyethylene terephthalate resin, an organic phosphorus flame retardant, and a flame retardant antidrip agent. Though this mechanism is unclear, the following reasons may be possibly considered.

In general, if a resin composition containing a polycarbonate resin of which the content is relatively great and a polyethylene terephthalate resin of which the content is relatively small is molded, a sea-island structure in which the polycarbonate resin is the sea and the polyethylene terephthalate resin is the island is formed. Also, it is considered that the starting point of the break when an impact is applied to a molded article with the sea-island structure is mainly the island (polyethylene terephthalate), an interface between the island and the sea (polycarbonate resin), or the like. Here, in the resin composition according to the exemplary embodiment, it is considered that the terminal group of the polyethylene terephthalate constituting the island and the glycidyl group of the glycidyl group-containing polyethylene copolymer react with each other and the polyethylene terephthalate resin is caused to have a high molecular weight so that the strength of the island is enhanced. In addition, the terminal group of the polyethylene terephthalate resin that constitutes the island and the glycidyl group of the glycidyl group-containing polyethylene copolymer react with each other, and the reaction between molecules of the terminal group of the polycarbonate resin and the glycidyl group occurs. That is, it is considered that the crosslink is formed between molecules of the polycarbonate resin and the polyethylene terephthalate so that the strength of the interface between the sea and the island is enhanced. Further, it is considered that the polyethylene copolymer functions as an elastomer having a rubber-like elastic member by cooling. These contribute to the enhancement of the surface impact strength of the resin molded article obtainable from the resin composition according to the exemplary embodiment.

In addition, the organic phosphorus flame retardant and the flame retardant antidrip agent in the resin composition according to the exemplary embodiment contribute to the enhancement of the flame retardance of the molded article, and by the combination of these materials and the glycidyl group-containing polyethylene resin, for example, when the molded article burns, it is considered that a carbonized layer is easily formed on the surface of the molded article, and thus, the flame retardance of the resin molded article is enhanced.

Hereinafter, respective components constituting the resin composition according to the exemplary embodiment are described.

Polycarbonate Resin

The polycarbonate resin includes aromatic polycarbonate, polyorganosiloxane-containing aromatic polycarbonate, aliphatic polycarbonate, alicyclic polycarbonate, and the like. In view of the surface impact strength of the resin molded article, the aromatic polycarbonate resin is preferable. Examples of the aromatic polycarbonate resin include bisphenol A-type, Z-type, S-type, MIBK-type, AP-type, TP-type, biphenyl-type, and bisphenol A water addition-type polycarbonates.

For example, the polycarbonate resin is produced by reaction of dihydric phenol and a carbonate precursor.

Examples of the dihydric phenol include 2,2-bis(4-hydroxyphenyl)propane[bisphenol A], bis(4-hydroxyphenyl) methane, 1,1-bis(4-hydroxyphenyl)ethane, 2,2-bis(4-hydroxy-3,5-dimethylphenyl)propane, bis(4-hydroxyphenyl) cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether and bis(4-hydroxyphenyl)ketone.

Examples of the carbonate precursor include carbonyl halide, carbonyl ester, and haloformate, and more specifically, include phosgene, dihaloformate of dihydric phenol, diphenyl carbonate, dimethyl carbonate, and diethyl carbonate.

The weight average molecular weight (Mw) of the polycarbonate resin is preferably in the range of 50,000 to 600,000. If the weight average molecular weight of the polycarbonate resin is in the range of 50,000 to 600,000, the surface impact strength of the resin molded article may be further enhanced, compared with the case in which the above range is not satisfied. In addition, the number average molecular weight (Mn) of the polycarbonate resin is preferably in the range of 10,000 to 30,000. If the number average molecular weight of the polycarbonate resin is less than 10,000, fluidity of the resin composition may become excessive to deteriorate workability of the resin molded article, and if the number average molecular weight of the polycarbonate resin is greater than 30,000, fluidity of the resin composition may decrease to deteriorate workability of the resin molded article.

The weight average molecular weight and the number average molecular weight are measured by gel permeation chromatography (GPC). The measurement of the molecular weight by GPC is performed by using GPC, HLC-8120 manufactured by Tosoh Corporation as a measuring apparatus, with a column, TSKgel Super HM-M (15 cm) manufactured by Tosoh Corporation, in a hexafluoro isopropanol solvent. The weight average molecular weight and the number average molecular weight are calculated by using a molecular weight calibration curve prepared by a monodispersed polystyrene standard sample from the measurement results. In the following, the weight average molecular weight and the number average molecular weight are measured in the same manner.

The content of the polycarbonate resin according to the exemplary embodiment is not particularly limited, as long as the content is in the range of 60% by weight to 90% by weight with respect to the total amount of the polycarbonate resin and the polyethylene terephthalate resin, but the content is preferably, for example, in the range of 40% by weight to 80% by weight. If the content of the aromatic polycarbonate is less than 60% by weight or greater than 90% by weight, the molding fluidity of the resin composition decreases, and thus the surface impact strength of the resin molded article decreases in some cases, compared with the case where the above range is satisfied.

The terminal hydroxyl group concentration of the polycarbonate resin according to the exemplary embodiment is preferably in the range of 10 µeq/g to 15 µeq/g. If the terminal hydroxyl group concentration of the polycarbonate resin is in the range of 10 µeq/g to 15 µeq/g, there are many terminal groups that react with the glycidyl group, compared with the case where the terminal hydroxyl group concentration of the polycarbonate resin is less than 10 µeq/g, and it is considered that more crosslinks are formed between the polycarbonate resin and the polyethylene terephthalate resin to further enhance the surface impact strength of the obtainable resin molded article. In addition, since the excessive reaction with the glycidyl group is prevented, compared with the case where the terminal hydroxyl group concentration of the polycarbonate resin is greater than 15 µeq/g, it is considered that the gelation of the polycarbonate component is prevented. Also, if the gelation of the polycarbonate component is prevented, the decrease of the molding fluidity in the resin composition is prevented, and thus it is considered that the surface impact strength is further enhanced. With respect to a virgin (unused) resin, the terminal hydroxyl group concentration of the polycarbonate resin is adjusted by the addition amount of the terminal sealing agent in a polymerization step. In addition, with respect to the polycarbonate resin (hereinafter, also referred to as "recycled PC resin" in some cases) collected from the market, the terminal hydroxyl group concentration changes depending on the use state in the market. In addition, a method of measuring the terminal hydroxyl group concentration is described in examples.

The polycarbonate resin according to the exemplary embodiment preferably contains the recycled PC resin. In the recycled PC resin, the hydrolysis progresses, compared with the polycarbonate resin before being released to the market, and thus the recycled PC resin is easily caused to be a polycarbonate resin having the terminal hydroxyl group concentration in the range of 10 µeq/g to 15 µeq/g. Therefore, it is considered that the surface impact strength of the resin molded article is enhanced.

For example, the recycled PC resin is prepared by collecting the resin molded article of the polycarbonate resin from the market, and pulverizing the collected resin molded articles with a crusher such as a dry-type or a wet-type crusher. For example, the content of the recycled PC resin is preferably in the range of 10% to 90% and more preferably in the range of 20% to 80%, of the polycarbonate resin included in the resin composition. If the content of the recycled PC resin is in the range of 10% to 90%, the impact resistance of the resin molded article is considered to be further enhanced, compared with the case where the above range is not satisfied.

Polyethylene Terephthalate Resin The content of the polyethylene terephthalate resin is not particularly limited, as long as the content is in the range of 10% by weight to 40% by weight with respect to the total amount of the polycarbonate resin and the polyethylene terephthalate resin, but, for example, the content is preferably in the range of 20% by weight to 30% by weight. If the content of the polyethylene terephthalate resin is less than 10% by weight or greater than 40% by weight, the molding fluidity of the resin decreases, compared with the case where the above range is satisfied, and thus surface impact strength of the resin molded article may decrease.

The weight average molecular weight of the polyethylene terephthalate resin according to the exemplary embodiment is preferably, for example, in a range of 5,000 to 100,000. Also, the number average molecular weight of the polyethylene terephthalate resin according to the exemplary embodiment is preferably, for example, in a range of 5,000 to 50,000. If the weight average molecular weight of the polyethylene terephthalate resin is less than 5,000 and the number average molecular weight is less than 5,000, fluidity of the resin composition may increase to deteriorate workability of the resin molded article, compared with the case in which the above range is satisfied. In addition, if the weight average molecular weight of the polyethylene terephthalate resin exceeds 100,000 and the number average molecular weight exceeds 50,000, fluidity of the resin composition may decrease to deteriorate workability of the resin molded article, compared with the case in which the above range is satisfied.

The acid value of the polyethylene terephthalate resin according to the exemplary embodiment is preferably in the range of 10 eq/t to 15 eq/t. If the acid value of the polyethylene terephthalate resin is in the range of 10 eq/t to 15 eq/t, since there are many terminal groups that react with the glycidyl group, compared with the case where the acid value of the polyethylene terephthalate resin is less than 10 eq/t, the polyethylene terephthalate resin is caused to have a high molecular weight, and thus it is considered that the surface impact strength of the resin molded article is further enhanced. In addition, the excessive reaction with the glycidyl group is prevented, compared with the case where the acid value of the polyethylene terephthalate resin is greater than 15 eq/t, and thus it is considered that the gelation of the polyethylene terephthalate component is prevented. Also, if the gelation of the polyethylene terephthalate component is prevented, the decrease of the molding fluidity in the resin composition is prevented, and thus it is considered that the surface impact strength is further enhanced. The acid value of polyethylene terephthalate is adjusted by the solid phase polymerization. In addition, the measurement method of the acid value is described in the examples.

The polyethylene terephthalate resin according to the exemplary embodiment preferably contains the polyethylene terephthalate resin (hereinafter, also referred to as "recycled PET resin" in some cases) collected from the market. In recycled PET resin, the hydrolysis progresses, compared with the PET resin before being released to the market, and thus the recycled PET resin is easily caused to be a PET resin having the acid value in the range of 10 eq/t to 15 eq/t. Therefore, it is considered that the surface impact strength of the resin molded article is enhanced.

For example, the recycled PET resin is prepared by collecting the resin molded article of the PET resin from the market, and pulverizing the collected resin molded articles with a crusher such as a dry-type or a wet-type crusher. For example, the content of the recycled PET resin is preferably 30% or greater and more preferably 40% or greater, of the aromatic polyester resin (B) contained in the resin composition. If the content of the recycled PET resin is 30% or greater, it is considered that the tensile elongation at break of the resin molded article may decrease, compared with the case in which the above range is not satisfied.

Glycidyl Group-Containing Polyethylene Copolymer

The glycidyl group-containing polyethylene copolymer is a polyethylene copolymer constituted with an ethylene unit and a glycidyl group-containing (meth) acrylic acid ester unit, in which the content of the glycidyl group-containing (meth) acrylic acid ester unit in the glycidyl group-containing polyethylene copolymer is in a range of 2% by weight to 20% by weight and which has a glass transition point of 0° C. or lower, or is a copolymer obtained by performing graft polymerization of a polymerizable vinyl monomer onto a main chain of the polyethylene copolymer constituted with an ethylene unit and the glycidyl group-containing (meth) acrylic acid ester unit. Examples of the glycidyl group-containing (meth) acrylic acid ester unit include constituent units derived from monomers such as glycidyl (meth) acrylate, vinyl glycidyl ether, (meth) acryl glycidyl ether, 2-methyl propenyl glycidyl ether, styrene-p-glycidyl ether, glycidyl cinnamate, itaconic acid glycidyl ester, and N-[4-(2,3-epoxypropoxy)-3,5-dimethyl benzyl]methacrylamide. In addition, "(meth) acryl" means acryl or methacryl.

It is considered that the glycidyl group-containing polyethylene copolymer used in the exemplary embodiment exhibits enhanced surface impact strength of the obtainable resin molded article, compared with a polyethylene copolymer which is constituted with an ethylene unit and a glycidyl group-containing (meth) acrylic acid ester unit and, in which the content of the glycidyl group-containing (meth) acrylic acid ester unit in the glycidyl group-containing polyethylene copolymer is less than 2% by weight or greater than 20% by weight. In addition, it is considered that, if the content of the glycidyl group-containing (meth) acrylic acid ester unit in the glycidyl group-containing polyethylene copolymer is less than 2% by weight, the polyethylene terephthalate resin is not liable to have a high molecular weight, compared with the case where the above range is satisfied, and if the content is greater than 20% by weight, fluidity of the resin composition is deteriorated, and thus the workability of the resin composition is deteriorated, compared with the case where the above range is satisfied. In addition, it is considered that, if the glass transition point is higher than 0° C., elasticity of the obtainable resin molded article is deteriorated, compared with the case where the glass transition point is 0° C. or lower.

The glass transition point of the glycidyl group-containing polyethylene copolymer means a glass transition point measured as follows. That is, a calorie spectrum is measured in a condition of temperature rising rate of 10° C. per minute with a differential calorimeter device (differential scanning calorimeter device DSC-60 manufactured by Shimadzu Corporation), and an intermediate value (Tgm) of two shoulder values obtained by a tangent line method from peaks derived from glass transition is set to be a glass transition point.

Examples of the method of producing the glycidyl group-containing polyethylene copolymer include a method of living-polymerizing monomers that constitute the ethylene unit and the glycidyl group-containing (meth) acrylic acid ester unit. Examples of the living polymerization include an anionic polymerization method in the presence of a mineral acid salt such as salt of alkali metal or alkali earth metal by using an organic alkali metal compound as a polymerization initiator, an anionic polymerization method in the presence of an organic aluminum compound by using an organic alkali metal compound as a polymerization initiator, a polymerization method using an organic rare earth metal complex as a polymerization initiator, and a radical polymerization method in the presence of a copper compound by using an α-halogenized ester compound as an initiator.

As a method of manufacturing a copolymer obtained by performing graft polymerization of the polymerizable vinyl monomer onto a main chain of the polyethylene copolymer, for example, a method of adding the polymerizable vinyl monomer to the polyethylene copolymer, and polymerizing the resultant in a single stage or multiple stages by radical polymerization.

Examples of the polymerizable vinyl monomer include an ester vinyl monomer unit, an aromatic vinyl monomer unit, and a vinyl cyanide monomer unit. Examples of the ester vinyl monomer unit include methyl (meth)acrylate, ethyl (meth)acrylate, butyl (meth) acrylate, isobutyl (meth)acrylate, and 2-ethylhexyl (meth)acrylate. Examples of the aromatic vinyl monomer include styrene and vinylnaphthalene. Examples of the vinyl cyanide monomer include acrylonitrile, α-chloroacrylonitrile, and methacrylonitrile.

For example, the weight average molecular weight of the glycidyl group-containing polyethylene copolymer is preferably from 3,000 to 100,000. If the weight average molecular weight of the glycidyl group-containing polyethylene copolymer is less than 3,000, the impact resistance may decrease, compared with the case in which the above range is satisfied, and if the weight average molecular weight of the glycidyl group-containing polyethylene copolymer exceeds 100,000, the dispersibility in the resin composition may decrease, compared with the case in which the above range is satisfied.

The content of the glycidyl group-containing polyethylene copolymer is preferably in a range of 4% by weight to 10% by weight and more preferably in a range of 6% by weight to 8% by weight, with respect to 100 parts by weight of the total amount of the polycarbonate resin and the polyethylene terephthalate resin. If the content of the glycidyl group-containing polyethylene copolymer is in a range of 4% by weight to 10% by weight, it is considered that surface impact strength of the obtainable resin molded article is further enhanced, compared with a case in which the content is less than 4% by weight or greater than 10% by weight.

Organic Phosphorus Flame Retardant

Examples of the organic phosphorus flame retardant include aromatic phosphate ester, aromatic condensed phosphate ester, phosphinic acid salt, and polyphosphate having a triazine skeleton. As an organic phosphorus flame retardant, a product synthesized arbitrarily or a commercial product may be used. As commercial products of the organic phosphorus flame retardant, "CR-741" manufactured by Daihachi Chemical Industry Co., Ltd., "AP422" manufactured by Clariant, and "Nova Excel 140" manufactured by Rin Kagaku Kogyo Co., Ltd. are included.

Flame Retardant Antidrip Agent

The flame retardant antidrip agent may be an agent that may prevent resin drip at the time of the burning of the resin molded article, and examples of the flame retardant antidrip agent include fluorine resins such as polytetrafluoroethylene, polyvinylidene fluoride, and polyhexafluoropropylene.

Other Components

The resin composition according to the exemplary embodiment may contain other components as long as the surface impact strength and the flame retardance of the obtainable resin molded article are not deteriorated. Examples of the other components include a hydrolysis inhibitor, an antioxidant, and a filler.

Examples of the hydrolysis inhibitor include a carbodiimide compound, and an oxazoline compound. Examples of the carbodiimide compound include dicyclohexylcarbodiimide, diisopropylcarbodiimide, dimethylcarbodiimide, diisobutyl carbodiimide, dioctyl carbodiimide, diphenyl carbodiimide, and naphthylcarbodiimide.

Examples of the antioxidant include phenol, amine, phosphorus, sulfur, hydroquinone, and quinoline antioxidants.

Examples of the filler include clay such as kaolin clay, bentonite clay, kibushi clay, and gairome clay, talc, mica, and montmorillonite.

Resin Molded Article

The resin molded article according to the exemplary embodiment includes a resin composition according to the exemplary embodiment. For example, the aforementioned resin composition according to the exemplary embodiment is molded, for example, by a molding method such as injection molding, extrusion molding, blow molding, and hot press molding, to obtain the resin molded article according to the exemplary embodiment. According to the exemplary embodiment, in view of the dispersibility of the respective components in the resin molded article, the resin molded article is preferably obtained by injection-molding the resin composition according to the exemplary embodiment.

The injection molding may be conducted by using a commercially available apparatuses such as "NEX 150" and "NEX 70000" manufactured by Nissei Plastic Industrial Co., Ltd., and "SE50D" manufactured by Toshiba Machine Co., Ltd. At this point, in view of the compatibilization of a polylactic resin, a styrene resin, an aromatic polycarbonate resin, a cylinder temperature is preferably from 170° C. to 280° C. In addition, in view of productivity and the like, a mold temperature is preferably from 30° C. to 120° C.

The resin molded article according to the exemplary embodiment is preferably used for electronic and electrical apparatuses, home appliances, containers, and interior materials for automobiles. More specifically, examples of the usage include housings, various components, or the like of home appliances or electronic and electrical apparatuses, wrapping films, storage cases of CD-ROM, DVD, or the like, tableware, food tray, drink bottle, medicine wrapping materials. Among these, the resin molded article according to the exemplary embodiment is preferably used for components of electronic and electrical apparatuses. Specifically, the components of electronic and electrical apparatuses require high impact resistance and flame retardance. Also, the resin molded article according to the exemplary embodiment which is obtainable from the resin composition described above has enhanced surface impact strength and flame retardance, compared with the resin molded article obtainable from a resin composition formed of a polycarbonate resin, a polyethylene terephthalate resin, an organic phosphorus flame retardant, and a flame retardant antidrip agent.

EXAMPLES

The invention is described more specifically in detail with reference to examples and comparative examples, but the invention is not limited to the following examples.

Polycarbonate Resin

Polycarbonate resins (hereinafter, referred to as a PC resin) used in the examples and the comparative examples are as follows. A PC resin A-1 is "L1225LL" manufactured by TEIJIN Limited, a PC resin A-2 is "L1225L" manufactured by TEIJIN Limited, a PC resin A-3 is "IB2500" manufactured by Idemitsu Kosan Co., Ltd., a PC resin A-4 is a compact disk-derived recycled PC resin, a PC resin A-5 is a semiconductor case-derived recycled PC resin, and PC resins A-6 and A-7 are drink bottle-derived recycled PC resins.

Polyethylene Terephthalate Resin

Polyethylene terephthalate resins (hereinafter, referred to as "PET resin") used in the examples and the comparative examples are as follows. A PET resin B-1 is "J125" manufactured by Mitsui Chemicals, Inc., a PET resin B-2 is a PET fiber-derived recycled PET resin, a PET resin B-3 is a PET drink bottle-derived recycled PET resin, and a PET resin B-4 is a PET film-derived recycled PET resin.

Weight average molecular weights (Mw), number average molecular weights (Mn), Mw/Mn, and terminal hydroxyl group concentrations of the PC resins A-1 to A-7 and acid values of the PET resins B-1 to B-4 are collectively presented in Table 1.

Measurement of Terminal Hydroxyl Group Concentration

The terminal hydroxyl group concentration (µeq/g) of the PC resin indicates the number of the phenolic terminal hydroxyl group existing in 1 g of the PC resin, and the measurement method thereof is colorimetry by a titanium tetrachloride/acetic acid method (method described in Macromol. Chem. 88215 (1965)).

Measurement of Acid Value

The acid value of the PET resin is measured in the following procedure.

Preparation of Sample

A sample is pulverized, is vacuum-dried for 24 hours at 70° C., and is weighed in a range of 0.20±0.0005 g using a scale. The weight at the point is set to be W(g). The 10 ml of benzyl alcohol and the weighed sample are added to a test tube, the test tube is immersed into an oil bath heated to 205° C., and the sample is melted while stirred by a glass rod. Samples of which the melting times are 3 minutes, 5 minutes, and 7 minutes are respectively set to be A, B, and C. Subsequently, a new test tube is prepared, and only benzyl alcohol is introduced and treated in the same procedure. Samples of which the melting times are 3 minutes, 5 minutes, and 7 minutes are respectively set to be a, b, and c.

Titration

The titration of the samples is performed by using 0.04 mol/l of potassium hydroxide solution (ethanol solution) of which the factor is known in advance. Phenol red is used as an indicator, a point at which the color of the sample is changed from yellowish green to pink is set to be the end point, and the titration amounts (ml)) of the potassium hydroxide solutions at the end point are obtained. The titration amounts of the samples A, B, and C are set to be XA, XB, and XC (ml), and the titration amounts of the samples a, b, and c are set to be Xa, Xb, and Xc (ml).

Calculation of Acid Value

The titration amounts V (ml) at the melting time 0 minutes are obtained in the least-squares method by using the titration amounts XA, XB, and XC for the respective melting times. In the same manner, the titration amounts V0 (ml) are obtained by using Xa, Xb, and Xc. Subsequently, the acid values are obtained by the following equation.

$$\text{acid value (eq/t)} = [(V-V0) \times 0.04 \times NF \times 1{,}000]/W$$

NF: Factor of 0.04 mol/l of potassium hydroxide solution
W: Weight of sample (g)

TABLE 1

| Polycarbonate resin | | Mw | Mn | Mw/Mn | Terminal hydroxyl group concentration (µeq/g) |
|---|---|---|---|---|---|
| PC Resin A-1 | L1225LL (TEIJIN) | 28,800 | 12,400 | 2.32 | 2 |
| PC Resin A-2 | L1225L (TEIJIN) | 39,000 | 15,900 | 2.45 | 3 |
| PC Resin A-3 | IB2500 (Idemitsu) | 57,600 | 20,500 | 2.80 | 2 |
| PC Resin A-4 | Compact disk-derived | 28,400 | 11,900 | 2.40 | 10 |
| PC Resin A-5 | semiconductor case-derived | 36,700 | 14,000 | 2.61 | 15 |
| PC Resin A-6 | Drink bottle-derived | 53,300 | 17,400 | 3.07 | 12 |
| PC Resin A-7 | Drink bottle-derived | 58,500 | 19,400 | 3.02 | 12 |

| Polyethylene terephthalate resin | | Acid value (eq/t) |
|---|---|---|
| PET Resin B-1 | J125 (Mitsui) | 7 |
| PET Resin B-2 | PET fiber-derived | 10 |
| PET Resin B-3 | PET drink bottle-derived | 15 |
| PET Resin B-4 | PET film-derived | 18 |

Glycidyl Group-containing Polyethylene Copolymer C-1

A glycidyl group-containing polyethylene copolymer C-1 is "AX8900" manufactured by ARKEMA, and is a glycidyl methacrylate/ethylene/methyl acrylate copolymer. A composition ratio of glycidyl methacrylate/ethylene/methyl acrylate is 8/68/24 (% by weight). A glass transition point (Tg) of the glycidyl group-containing polyethylene copolymer C-1 is -33° C.

Glycidyl Group-Containing Polyethylene Copolymer C-2

A glycidyl group-containing polyethylene copolymer C-2 is "Bondfast 7L" manufactured by Sumitomo Chemical Co., Ltd., and is a glycidyl methacrylate/ethylene/methyl acrylate copolymer. A composition ratio of glycidyl methacrylate/ethylene/methyl acrylate is 3/70/27 (% by weight). A glass transition point (Tg) of the glycidyl group-containing polyethylene copolymer C-2 is -33° C.

Glycidyl Group-Containing Polyethylene Copolymer C-3

A glycidyl group-containing polyethylene copolymer C-3 is "CG5001" manufactured by Sumitomo Chemical Co., Ltd., and is a glycidyl methacrylate/ethylene copolymer. The composition ratio of glycidyl methacrylate/ethylene is 19/81 (% by weight). A glass transition point (Tg) of the glycidyl group-containing polyethylene copolymer C-3 is -38° C.

Glycidyl Group-containing Polyethylene Copolymer C-4

A glycidyl group-containing polyethylene copolymer C-4 is "Modiper A4300" manufactured by NOF Corporation, and is a copolymer obtained by performing graft polymerization of butyl acrylate and methyl methacrylate, as a vinyl monomer, onto a main chain of the glycidyl methacrylate/ethylene copolymer. The composition ratio of glycidyl methacrylate/ethylene/butyl acrylate/methyl methacrylate is 9/61/21/9 (% by weight). A glass transition point (Tg) of the glycidyl methacrylate/ethylene copolymer is -45° C.

Glycidyl Group-containing Polyethylene Copolymer C-5

6 parts by weight of glycidyl methacrylate, and 0.5 parts by weight of dialkyl peroxide (Product name: Perhexa 25B manufactured by NOF Corporation) are evenly mixed with 94 parts by weight of polyethylene (Product name: Nipolon-Z 1P53A manufactured by Tosoh Corporation) in Henschel mixer. Thereafter, the resultant is extruded at a cylinder temperature of 220° C. with a twin screw extruder (Product name: TEM-35 manufactured by Toshiba Machine Co., Ltd.) to obtain an ethylene/glycidyl methacrylate copolymer (composition ratio of ethylene/glycidyl methacrylate=94/6 (% by weight)). A glass transition point (Tg) of the ethylene/glycidyl methacrylate copolymer is −51° C. This is set to be a glycidyl group-containing polyethylene copolymer C-5.

Glycidyl Group-containing Polyethylene Copolymer C-6

12 parts by weight of glycidyl methacrylate, 88 parts by weight of polyethylene, and 0.5 parts by weight of dialkyl peroxide are extruded under the same condition as for the copolymer C-5 to obtain an ethylene/glycidyl methacrylate copolymer (composition ratio of ethylene/glycidyl methacrylate=88/12 (% by weight)). A glass transition point (Tg) of the ethylene/glycidyl methacrylate copolymer is −42° C. This is set to be a glycidyl group-containing polyethylene copolymer C-6.

Comparative Polymer C-7

A comparative polymer C-7 is "VC40" manufactured by Sumimoto Chemical Co., Ltd., which is an ethylene homopolymer. A glass transition point (Tg) of the ethylene homopolymer is −58° C.

Comparative Polymer C-8

A comparative polymer C-8 is "Modiper A5300" manufactured by NOF Corporation, which is a copolymer methacrylate copolymer (composition ratio=62/38 (% by weight)). A glass transition point (Tg) of the ethylene/methyl methacrylate copolymer is 4° C. This is set to be a comparative polymer C-10.

Comparative Polymer C-11

2 parts by weight of glycidyl methacrylate, 26 parts by weight of acrylonitrile, and 72 parts by weight of styrene are mixed to obtain a glycidyl methacrylate/acrylonitrile/styrene copolymer (composition ratio=2/26/72 (% by weight)). A glass transition point (Tg) of the glycidyl methacrylate/acrylonitrile/styrene copolymer is 100° C. This is set to be a comparative polymer C-11.

Comparative Polymer C-12

1 part by weight of glycidyl methacrylate, 99 parts by weight of polyethylene, and 0.5 parts by weight of dialkyl peroxide are extruded under the same condition as for the copolymer C-5 to obtain an ethylene/glycidyl methacrylate copolymer (composition ratio of ethylene/glycidyl methacrylate=99/1 (% by weight)). A glass transition point (Tg) of the ethylene/glycidyl methacrylate copolymer is −56° C. This is set to be a comparative polymer C-12.

Compositions of the glycidyl group-containing polyethylene copolymers C-1 to C-6 and the comparative polymers C-7 to C-12 are collectively presented in Table 2.

TABLE 2

| | | | Glycidyl group-containing polyethylene copolymer | | | | | | Comparative polymer | | | | | |
|---|---|---|---|---|---|---|---|---|---|---|---|---|---|---|
| | | | C-1 | C-2 | C-3 | C-4 | C-5 | C-6 | C-7 | C-8 | C-9 | C-10 | C-11 | C-12 |
| Components of main chain | Glycidyl group-containing (meth)acrylic acid ester unit | Glycidyl methacrylate | 8 | 3 | 19 | 9 | 6 | 12 | | | 25 | | 2 | 1 |
| | Others | Ethylene | 68 | 70 | 81 | 61 | 94 | 88 | 100 | 56 | 75 | 62 | | 99 |
| | | Methyl methacrylate | | | | | | | | | | 38 | | |
| | | Methyl acrylate | 24 | 27 | | | | | | | | | | |
| | | Ethyl acrylate | | | | | | | | 14 | | | | |
| | | Acrylonitrile | | | | | | | | | | | 26 | |
| | | Styrene | | | | | | | | | | | 72 | |
| Components of side chain | | Butyl acrylate | | | | 21 | | | | 21 | | | | |
| | | Methyl methacrylate | | | | 9 | | | | 9 | | | | |
| | | Acrylonitrile | | | | | | | | | | | | |
| | | Styrene | | | | | | | | | | | | |
| | | Tg of main chain (° C.) | −33 | −33 | −38 | −45 | −51 | −42 | −58 | −51 | −32 | 4 | 100 | −56 | obtained by graft-polymerizing butyl acrylate and methyl methacrylate as a vinyl monomer with a main chain of the ethylene/ethyl acrylate copolymer. The composition ratio of ethylene/ethyl acrylate/butyl acrylate/methyl methacrylate is 56/14/21/9 (% by weight). A glass transition point (Tg) of the ethylene/ethyl acrylate copolymer is −51° C.

Comparative Polymer C-9

25 parts by weight of glycidyl methacrylate, 75 parts by weight of polyethylene, and 0.5 parts by weight of dialkyl peroxide are extruded under the same condition as for the copolymer C-5 to obtain an ethylene/glycidyl methacrylate copolymer (composition ratio of ethylene/glycidyl methacrylate=75/25 (% by weight)). A glass transition point (Tg) of the ethylene/glycidyl methacrylate copolymer is −32° C. This is set to be a comparative polymer C-9.

Comparative Polymer C-10

62 parts by weight of ethylene, and 38 parts by weight of methyl methacrylate are mixed, to obtain ethylene/methyl Example 1

In the compositions presented in Table 3 (all are presented in with "part by weight"), 70 parts by weight of the PC resin A-7, 30 parts by weight of the PET resin B-3, 4 parts by weight of the glycidyl group-containing polyethylene copolymer C-1, 15 parts by weight of the aromatic condensed phosphate ester flame retardant (Product name: "CR-741", phosphorus: 9%, manufactured by Daihachi Chemical Industry Co., Ltd.), 1 part by weight of the flame retardant antidrip agent (Product name "A-3800", content of polytetrafluoroethylene: 50%, manufactured by Mitsubishi Rayon Co., Ltd.), and 0.2 parts by weight of the antioxidant (phenol antioxidant, Product name: "Irganox 1076" manufactured by BASF Japan Ltd.) are mixed in a tumbler, and are melted, kneaded, and extruded with a vented twin screw extruder (TEX-30α manufactured by The Japan Steel Works, LTD.), at a cylinder temperature and a die temperature of 260° C., the number of screw rotation of 240 rpm, a degree of ventilation suction of 100 MPa, and a discharging amount of 10 kg/h. Also, the resin discharged from the twin screw extruder is cut into a pellet shape, to obtain pellets.

The obtained pellet-shaped resin composition is dried with a hot air dryer at 90° C. for 4 hours, and injection-molded with an injection molding machine (Product name: "NEX500" manufactured by Toshiba Machine Co., Ltd.) at a cylinder temperature of 260° C. and a mold temperature of 60° C., to obtain a predetermined resin molded article (test piece for evaluation).

Example 2

A predetermined resin molded article (test piece for evaluation) is obtained in the same condition as in Example 1 except for using the glycidyl group-containing polyethylene copolymer C-2 instead of the glycidyl group-containing polyethylene copolymer C-1.

Example 3

A predetermined resin molded article (test piece for evaluation) is obtained in the same condition as in Example 1 except for using the glycidyl group-containing polyethylene copolymer C-3 instead of the glycidyl group-containing polyethylene copolymer C-1.

Example 4

A predetermined resin molded article (test piece for evaluation) is obtained in the same condition as in Example 1 except for using the glycidyl group-containing polyethylene copolymer C-4 instead of the glycidyl group-containing polyethylene copolymer C-1.

Example 5

A predetermined resin molded article (test piece for evaluation) is obtained in the same condition as in Example 1 except for using the glycidyl group-containing polyethylene copolymer C-5 instead of the glycidyl group-containing polyethylene copolymer C-1.

Example 6

A predetermined resin molded article (test piece for evaluation) is obtained in the same condition as in Example 1 except for using the glycidyl group-containing polyethylene copolymer C-6 instead of the glycidyl group-containing polyethylene copolymer C-1.

Comparative Example 1

A predetermined resin molded article (test piece for evaluation) is obtained in the same condition as in Example 1 except for using the comparative polymer C-7 instead of the glycidyl group-containing polyethylene copolymer C-1.

Comparative Example 2

A predetermined resin molded article (test piece for evaluation) is obtained in the same condition as in Example 1 except for using the comparative polymer C-8 instead of the glycidyl group-containing polyethylene copolymer C-1.

Comparative Example 3

A predetermined resin molded article (test piece for evaluation) is obtained in the same condition as in Example 1 except for using the comparative polymer C-9 instead of the glycidyl group-containing polyethylene copolymer C-1.

Comparative Example 4

A predetermined resin molded article (test piece for evaluation) is obtained in the same condition as in Example 1 except for using the comparative polymer C-10 instead of the glycidyl group-containing polyethylene copolymer C-1.

Comparative Example 5

A predetermined resin molded article (test piece for evaluation) is obtained in the same condition as in Example 1 except for using the comparative polymer C-11 instead of the glycidyl group-containing polyethylene copolymer C-1.

Comparative Example 6

A predetermined resin molded article (test piece for evaluation) is obtained in the same condition as in Example 1 except for using the comparative polymer C-12 instead of the glycidyl group-containing polyethylene copolymer C-1.

Comparative Example 7

A predetermined resin molded article (test piece for evaluation) is obtained in the same condition as in Example except for not adding the glycidyl group-containing polyethylene copolymer C-1.

Comparative Example 8

A predetermined resin molded article (test piece for evaluation) is obtained in the same condition as in Example 1 except for changing a content of the PC resin A-7 from 70 parts by weight to 50 parts by weight and changing a content of the PET resin B-3 from 30 parts by weight to 50 parts by weight.

Evaluation and Test

The following evaluation and tests are performed by using the obtainable test pieces for evaluation. Compositions of the resin compositions of Examples 1 to 6 (all are presented using parts by weight) and test results below are collectively presented in Table 3. In addition, compositions of the resin compositions of Comparative Examples 1 to 7 (all are presented using parts by weight), and test results below are collectively presented in Table 4.

Flame Retardance Test

UL-V tests are conducted using UL test pieces (0.8 mm and 1.5 mm of thicknesses) for V test in UL-94 in conformity with a method regulated in UL-94, to measure a degree of flame retardance of the test pieces. Here, degrees of the flame retardance in the UL-94 standard are not-V, V-2, V-1, V-0, and 5VB in an ascending order of the flame retardance.

Test of Heat Resistance

In a state of applying a load (1.8 MPa) determined in a test method standard of ASTM D648 to a test piece, a temperature of the test piece for evaluation is increased, a temperature at which a size of deflection becomes a specific value (deflection temperature under load: DTUL) is measured. This is estimated as a heat resistant temperature.

Test of tensile strength and tensile elongation at break

The tensile strength and the tensile elongation at break of the test piece are measured in conformity with JIS K-7113. Further, as a molded article, a test piece (thickness of 4 mm) of JIS1 obtained by injection molding is used. As a value of the tensile strength is greater, the tensile strength is better. As a value of the tensile elongation at break is greater, the tensile elongation at break is better.

Test of Impact Resistance

Charpy impact resistance strength (Unit: kJ/m$^2$) is measured by using a product obtained by performing notch process on an ISO multipurpose dumbbell test piece, in conformity with ISO-179, with a digital impact tester (DG-5 manufactured by Toyo Seiki Seisaku-Sho Ltd.) in the MD direction, in the condition that a rising angle is 150°, an energy of the hammer used is 2.0 J, a number of measurement is n=10. As the value of the Charpy impact resistance strength is greater, the impact resistance is better.

Surface Impact Strength Test 60 mm×60 mm of a flat plate having 2 mm in thickness is produced by injection molding, and a test piece obtained by cutting a 10 mm×10 mm square hole on the center of the flat plate is prepared. On the center of the test piece, a steel ball having a diameter of 50 mm and a weight of 500 g is dropped and impacted from the height in a range of 0.7 m to 2 m, and the surface impact strength is evaluated in the following conditions. The test of the surface impact strength is performed three times at respective heights. In addition, it is considered that it is preferable in practice to get "A" in the evaluation at the steel ball dropping height of 1.3 m.

A: No crack is generated around square hole of test piece
B: 1 to 3 cracks are generated around square hole of test piece
C: Test piece is broken into plural pieces Test of Strength of Louver Portion (Opening Portion)

A test piece 1 having a grid-shaped louver portion 10 (opening portion) as illustrated in FIG. 1 is molded by using an injection molding machine. A steel ball having a diameter of 50 mm and a weight of 500 g is dropped and impacted from 1.3 m of the height on the center of the test piece 1 illustrated in FIG. 1, and the louver portion strength is evaluated in the following conditions. The test of the louver portion strength is performed three times. In addition, it is considered that it is preferable in practice to get "A" in the evaluation at the steel ball dropping height of 1.3 m.

A: No crack is generated in test piece or only small cracks of 1 mm or less in thickness direction are generated
B: One or two fractures are generated around louver portion
C: Three or more fractures are generated around louver portion

TABLE 3

| | Composition | Example 1 | Example 2 | Example 3 | Example 4 | Example 5 | Example 6 |
|---|---|---|---|---|---|---|---|
| Resin composition | PC resin A-7 | 70 | 70 | 70 | 70 | 70 | 70 |
| | PET resin B-3 | 30 | 30 | 30 | 30 | 30 | 30 |
| | Glycidyl group-containing polyethylene copolymer C-1 | 4 | | | | | |
| | Glycidyl group-containing polyethylene copolymer C-2 | | 4 | | | | |
| | Glycidyl group-containing polyethylene copolymer C-3 | | | 4 | | | |
| | Glycidyl group-containing polyethylene copolymer C-4 | | | | 4 | | |
| | Glycidyl group-containing polyethylene copolymer C-5 | | | | | 4 | |
| | Glycidyl group-containing polyethylene copolymer C-6 | | | | | | 4 |
| | Aromatic condensed phosphate ester flame retardant | 15 | 15 | 15 | 15 | 15 | 15 |
| | Flame retardant antidrip agent | 1.0 | 1.0 | 1.0 | 1.0 | 1.0 | 1.0 |
| | Antioxidant | 0.2 | 0.2 | 0.2 | 0.2 | 0.2 | 0.2 |
| Evaluation result | | | | | | | |
| Flame retardance | UL94 flame retardance (0.8 mm in thickness) | V-0 | V-0 | V-0 | V-0 | V-0 | V-0 |
| | UL94 flame retardance (1.5 mm in thickness) | 5VB | 5VB | 5VB | 5VB | 5VB | 5VB |
| heat resistance | DTUL (1.8 MPa) | 72.7 | 72.4 | 72.8 | 71.8 | 72.0 | 72.6 |
| Mechanical characteristics | Tensile strength (MPa) | 62 | 62 | 61 | 62 | 62 | 62 |
| | Tensile elongation at break (%) | 110 | 28 | 18 | 74 | 92 | 26 |
| | Charpy impact strength (kJ/m$^2$) | 14 | 10 | 9 | 12 | 16 | 11 |
| Surface impact strength | Dropping height 0.7 m | AAA | AAA | AAA | AAA | AAA | AAA |
| | Dropping height 1.0 m | AAA | AAA | AAA | AAA | AAA | AAA |
| | Dropping height 1.3 m | AAA | AAA | AAA | AAA | AAA | AAA |
| | Dropping height 1.6 m | AAB | BBB | BBC | BBB | AAB | BBB |
| | Dropping height 2.0 m | BBB | BCC | CCC | BBC | ABB | CCC |
| Strength of louver portion | Dropping height 1.3 m | AAA | AAA | AAA | AAA | AAA | AAA |

TABLE 4

| Composition | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Resin composition | PC resin A-7 | 70 | 70 | 70 | 70 | 70 | 70 | 70 | 50 |
| | PET resin B-3 | 30 | 30 | 30 | 30 | 30 | 30 | 30 | 50 |
| | Comparative polymer C-7 | 4 | | | | | | | |
| | Comparative polymer C-8 | | 4 | | | | | | |
| | Comparative polymer C-9 | | | 4 | | | | | |
| | Comparative polymer C-10 | | | | 4 | | | | |
| | Comparative polymer C-11 | | | | | 4 | | | |
| | Comparative polymer C-12 | | | | | | 4 | | |
| | Glycidyl group-containing polyethylene copolymer C-1 | | | | | | | | 4 |
| | Aromatic condensed phosphate ester flame retardant | 15 | 15 | 15 | 15 | 15 | 15 | 15 | 15 |
| | Flame retardant antidrip agent | 1.0 | 1.0 | 1.0 | 1.0 | 1.0 | 1.0 | 1.0 | 1.0 |
| | Antioxidant | 0.2 | 0.2 | 0.2 | 0.2 | 0.2 | 0.2 | 0.2 | 0.2 |
| Evaluation result | | | | | | | | | |
| Flame retardance | UL94 flame retardance (0.8 mm in thickness) | not-V | not-V | V-1 | not-V | not-V | not-V | not-V | not-V |
| | UL94 flame retardance (1.5 mm in thickness) | not-V | V-2 | V-0 | not-V | V-2 | V-1 | V-2 | not-V |
| heat resistance | DTUL (1.8 MPa) | 70.1 | 70.8 | 71.8 | 70.1 | 70.1 | 72.0 | 69.8 | 60.2 |
| Mechanical characteristics | Tensile strength (MPa) | 59 | 57 | 60 | 57 | 59 | 60 | 56 | 55 |
| | Tensile elongation at break (%) | 8 | 6 | 14 | 8 | 5 | 13 | 3 | 12 |
| | Charpy impact strength (kJ/m$^2$) | 4 | 3 | 8 | 3 | 1 | 5 | 1 | 3 |
| Surface impact strength | Dropping height 0.7 m | BCC | CCC | AAA | CCC | CCC | AAA | CCC | CCC |
| | Dropping height 1.0 m | CCC | CCC | AAA | CCC | CCC | ABB | CCC | CCC |
| | Dropping height 1.3 m | CCC | CCC | AAB | CCC | CCC | BCC | CCC | CCC |
| | Dropping height 1.6 m | CCC | CCC | BBC | CCC | CCC | CCC | CCC | CCC |
| | Dropping height 2.0 m | CCC | CCC | CCC | CCC | CCC | CCC | CCC | CCC |
| Strength of louver portion | Dropping height 1.3 m | CCC | CCC | AAC | CCC | CCC | ACC | CCC | CCC |

As presented in Tables 3 and 4, the resin molded articles of Examples 1 to 6 obtainable from the resin composition containing the PC resin, the PET resin, the glycidyl group-containing polyethylene copolymer, the organic phosphorus flame retardant, and the flame retardant antidrip agent have enhanced surface impact strength and flame retardance, compared with the resin molded article in Comparative Example 7 obtainable from the resin composition containing the PC resin, the PET resin, the organic phosphorus flame retardant, and the flame retardant antidrip agent. In addition, the resin molded articles of Examples 1 to 6 have enhanced surface impact strength and flame retardance, compared with Comparative Examples 1 and 2 using the ethylene resin not having the glycidyl group, respectively, Comparative Example 8 of which the contents of the PC resin and the PET resin are 50% by weight, Comparative Examples 3 and 6 using the glycidyl group-containing polyethylene copolymers in which the contents of the glycidyl group-containing methacrylic acid ester unit are greater than 20% by weight and less than 2% by weight, respectively.

In addition, the resin molded articles in Examples 1, 5, and 6 each using the glycidyl group-containing polyethylene copolymer in which the content of the glycidyl group-containing methacrylic acid ester unit is in the range of 6% by weight to 12% by weight have further enhanced surface impact strength, compared with Examples 2 and 3 in which the contents of the glycidyl group-containing methacrylic acid ester unit are less than 6% by weight and greater than 12% by weight, respectively.

Example 7

A predetermined resin molded article (test piece for evaluation) is obtained in the same condition as in Example except for changing the content of the glycidyl group-containing polyethylene copolymer C-1 from 4 parts by weight to 10 parts by weight.

Example 8

A predetermined resin molded article (test piece for evaluation) is obtained in the same condition as in Example except for changing the content of the glycidyl group-containing polyethylene copolymer C-1 from 4 parts by weight to 3 parts by weight.

Example 9

A predetermined resin molded article (test piece for evaluation) is obtained in the same condition as in Example 1 except for changing the content of the glycidyl group-containing polyethylene copolymer C-1 from 4 parts by weight to 11 parts by weight.

Example 10

A predetermined resin molded article (test piece for evaluation) is obtained in the same condition as in Example 1 except for changing the content of the PC resin A-7 from 60 parts by weight to 70 parts by weight, and the content of the PET resin B-3 from 30 parts by weight to 40 parts by weight.

Example 11

A predetermined resin molded article (test piece for evaluation) is obtained in the same condition as in Example 1 except for changing the content of the PC resin A-7 from 60 parts by weight to 90 parts by weight, and the content of the PET resin B-3 from 30 parts by weight to 10 parts by weight.

Example 12

A predetermined resin molded article (test piece for evaluation) is obtained in the same condition as in Example 1 except for using the PC resin A-6 instead of the PC resin A-7.

Example 13

A predetermined resin molded article (test piece for evaluation) is obtained in the same condition as in Example 1 except for using the PC resin A-1 instead of the PC resin A-7.

Example 14

A predetermined resin molded article (test piece for evaluation) is obtained in the same condition as in Example 1 except for using the PC resin A-2 instead of the PC resin A-7.

Example 15

A predetermined resin molded article (test piece for evaluation) is obtained in the same condition as in Example 1 except for using the PC resin A-3 instead of the PC resin A-7.

Example 16

A predetermined resin molded article (test piece for evaluation) is obtained in the same condition as in Example 1 except for using the PC resin A-4 instead of the PC resin A-7.

Example 17

A predetermined resin molded article (test piece for evaluation) is obtained in the same condition as in Example 1 except for using the PC resin A-5 instead of the PC resin A-7.

Example 18

A predetermined resin molded article (test piece for evaluation) is obtained in the same condition as in Example 1 except for using the PET resin B-2 instead of the PET resin B-3.

Example 19

A predetermined resin molded article (test piece for evaluation) is obtained in the same condition as in Example 1 except for using a PET resin B-4 instead of the PET resin B-3.

Example 20

A predetermined resin molded article (test piece for evaluation) is obtained in the same condition as in Example 1 except for using the PET resin B-1 instead of the PET resin B-3.

Evaluations and tests are performed in the same manner as in Example 1 by using obtainable test pieces for evaluation. Compositions of the resin compositions of Examples 7 to 17 (all are presented using parts by weight), and results of the tests are collectively presented in Table 5. Compositions of the resin compositions of Examples 18 to 20 (all are presented using parts by weight), and results of the tests are collectively presented in Table 6.

TABLE 5

|  | Composition | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|
| Resin composition | PC resin A-1 |  |  |  |  |  |  | 70 |  |  |  |  |
|  | PC resin A-2 |  |  |  |  |  |  |  | 70 |  |  |  |
|  | PC resin A-3 |  |  |  |  |  |  |  |  | 70 |  |  |
|  | PC resin A-4 |  |  |  |  |  |  |  |  |  | 70 |  |
|  | PC resin A-5 |  |  |  |  |  |  |  |  |  |  | 70 |
|  | PC resin A-6 |  |  |  |  |  | 70 |  |  |  |  |  |
|  | PC resin A-7 | 70 | 70 | 70 | 60 | 90 |  |  |  |  |  |  |
|  | PET resin B-3 | 30 | 30 | 30 | 40 | 10 | 30 | 30 | 30 | 30 | 30 | 30 |
|  | Glycidyl group-containing polyethylene copolymer C-1 | 10 | 3 | 11 | 4 | 4 | 4 | 4 | 4 | 4 | 4 | 4 |
|  | Aromatic condensed phosphate ester flame retardant | 15 | 15 | 15 | 15 | 15 | 15 | 15 | 15 | 15 | 15 | 15 |

TABLE 5-continued

|  | Composition | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|
|  | Flame retardant antidrip agent | 1.0 | 1.0 | 1.0 | 1.0 | 1.0 | 1.0 | 1.0 | 1.0 | 1.0 | 1.0 | 1.0 |
|  | Antioxidant | 0.2 | 0.2 | 0.2 | 0.2 | 0.2 | 0.2 | 0.2 | 0.2 | 0.2 | 0.2 | 0.2 |
| Evaluation result |  |  |  |  |  |  |  |  |  |  |  |  |
| Flame retardance | UL94 flame retardance (0.8 mm in thickness) | V-0 | V-1 | V-1 | V-1 | V-0 | V-0 | not-V | V-1 | V-0 | V-1 | V-1 |
|  | UL94 flame retardance (1.5 mm in thickness) | 5VB | 5VB | 5VB | 5VB | 5VB | 5VB | V-1 | V-1 | 5VB | V-0 | 5VB |
| heat resistance | DTUL (1.8 MPa) | 71.4 | 71.3 | 70.5 | 68.9 | 71.8 | 72 | 72.1 | 71.4 | 72 | 72.2 | 71.6 |
| Mechanical characteristics | Tensile strength (MPa) | 61 | 61 | 60 | 59 | 63 | 61 | 60 | 60 | 61 | 60 | 61 |
|  | Tensile elongation at break (%) | 69 | 58 | 29 | 100 | 16 | 56 | 24 | 27 | 56 | 28 | 38 |
|  | Charpy impact strength (kJ/m$^2$) | 22 | 9 | 16 | 9 | 26 | 12 | 6 | 7 | 12 | 7 | 8 |
| Surface impact strength | Dropping height 0.7 m | AAA | AAA | AAA | AAA | AAA | AAA | AAB | AAA | AAA | AAA | AAA |
|  | Dropping height 1.0 m | AAA | AAA | AAA | AAA | AAA | AAA | BBB | ABB | AAA | AAB | AAA |
|  | Dropping height 1.3 m | AAA | AAA | AAA | AAA | AAA | AAA | BBB | BBB | AAA | ABB | AAB |
|  | Dropping height 1.6 m | AAA | BBB | AAB | BCC | AAA | ABB | CCC | CCC | BBC | CCC | BBC |
|  | Dropping height 2.0 m | AAA | BCC | ABB | CCC | AAA | BBB | CCC | CCC | CCC | CCC | CCC |
| Strength of louver portion | Dropping height 1.3 m | AAA | AAB | AAB | AAA | AAA | AAA | BBB | BBB | AAB | BBB | ABB |

TABLE 6

|  | Composition | Example 18 | Example 19 | Example 20 |
|---|---|---|---|---|
| Resin composition | PC resin A-7 | 70 | 70 | 70 |
|  | PET resin B-2 | 30 |  |  |
|  | PET resin B-4 |  | 30 |  |
|  | PET resin B-1 |  |  | 30 |
|  | Glycidyl group-containing polyethylene copolymer C-1 | 4 | 4 | 4 |
|  | Aromatic condensed phosphate ester flame retardant | 15 | 15 | 15 |
|  | Flame retardant antidrip agent | 1.0 | 1.0 | 1.0 |
|  | Antioxidant | 0.2 | 0.2 | 0.2 |
| Evaluation result |  |  |  |  |
| Flame retardance | UL94 flame retardance (0.8 mm in thickness) | V-0 | V-0 | V-1 |
|  | UL94 flame retardance (1.5 mm in thickness) | 5VB | 5VB | 5VB |
| Heat resistance | DTUL (1.8 MPa) | 72 | 71.8 | 71.1 |
| Mechanical characteristics | Tensile strength (MPa) | 61 | 61 | 60 |
|  | Tensile elongation at break (%) | 86 | 62 | 50 |
|  | Charpy impact strength (kJ/m$^2$) | 12 | 15 | 12 |
| Surface impact strength | Dropping height 0.7 m | AAA | AAA | AAA |
|  | Dropping height 1.0 m | AAA | AAA | AAA |
|  | Dropping height 1.3 m | AAA | AAA | AAA |
|  | Dropping height 1.6 m | ABB | AAB | ABB |
|  | Dropping height 2.0 m | BBB | BBC | BCC |
| Strength of louver portion | Dropping height 1.3 m | AAA | AAA | AAB |

As presented in Tables 5 and 6, Examples 1 and 7 in which the content of the glycidyl group-containing polyethylene copolymer is in the range of 4% by weight to 10% by weight with respect to 100 parts by weight of the total amount of the PC resin and the PET resin have further enhanced surface impact strength, compared with Examples 8 and 9 in which the contents thereof are less than 4% by weight and greater than 10% by weight, respectively.

In addition, Examples 10 and 11 in which the content of the PC resin is in the range of 60% by weight to 90% by weight and the content of the PET resin is in the range of 10% by weight to 40% by weight have enhanced surface impact strength and flame retardance, compared with Comparative Example 8 in which the contents of the PC resin and the PET resin are 50% by weight.

In addition, Examples 1, 12, and 16 in which the weight average molecular weight of the PC resin is in the range of 50,000 to 60,000 and Examples 1, 12, 16, and 17 in which the terminal hydroxyl group concentration of the PC resin is in the range of 10 μeq/g to 15 μeq/g have further enhanced surface impact strength, compared with Examples 13 and 14 in which the weight average molecular weight and the terminal hydroxyl group concentration of the PC resin do not satisfy the ranges.

In addition, Examples 1 and 18 in which the acid value of the PET resin is in the range of 10 eq/t to 15 eq/t have further enhanced surface impact strength, compared with Examples 19 and 20 in which the acid values of the PET resins do not satisfy the above range.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a polycarbonate resin;
a polyethylene terephthalate resin;
a glycidyl group-containing polyethylene copolymer;
an organic phosphorus flame retardant;
a flame retardant antidrip agent; and
an antioxidant,
wherein a content of the polycarbonate resin is in a range of 60% by weight to 90% by weight and a content of the polyethylene terephthalate resin is in a range of 10% by weight to 40% by weight, with respect to a total amount of the polycarbonate resin and the polyethylene terephthalate resin,
wherein the glycidyl group-containing polyethylene copolymer is a polyethylene copolymer which is constituted with a glycidyl group-containing (meth)acrylic acid ester unit and an ethylene unit, in which a content of the glycidyl group-containing (meth)acrylic acid ester unit in the glycidyl group-containing polyethylene copolymer is in a range of 2% by weight to 20% by weight, and has a glass transition point of 0° C. or lower, or is a copolymer obtained by performing graft polymerization of a polymerizable vinyl monomer onto a main chain of the polyethylene copolymer constituted with a glycidyl group-containing (meth)acrylic acid ester unit and an ethylene unit,
wherein a content of the glycidyl group-containing polyethylene copolymer is in a range of 4% by weight to 10% by weight with respect to 100 parts by weight of a total amount of the polycarbonate resin and the polyethylene terephthalate resin, and
wherein a content of the organic phosphorus flame retardant is 15% by weight, a content of the flame retardant antidrip agent is 1% by weight, and a content of the antioxidant is 0.2% by weight with respect to 100 parts by weight of a total amount of the polycarbonate resin and the polyethylene terephthalate.

2. The resin composition according to claim 1, wherein a weight average molecular weight of the polycarbonate resin is in a range of 50,000 to 60,000.

3. The resin composition according to claim 2, wherein a terminal hydroxyl group concentration of the polycarbonate resin is in a range of 10 μeq/g to 15 μeq/g.

4. The resin composition according to claim 3, wherein an acid value of the polyethylene terephthalate resin is in a range of 10 eq/t to 15 eq/t.

5. The resin composition according to claim 2, wherein an acid value of the polyethylene terephthalate resin is in a range of 10 eq/t to 15 eq/t.

6. The resin composition according to claim 1, wherein an acid value of the polyethylene terephthalate resin is in a range of 10 eq/t to 15 eq/t.

7. A resin molded article comprising the resin composition according to claim 1.

8. A resin composition comprising:
a polycarbonate resin;
a polyethylene terephthalate resin;
a glycidyl group-containing polyethylene copolymer;
an organic phosphorus flame retardant;
a flame retardant antidrip agent; and
an antioxidant,
wherein a content of the polycarbonate resin is in a range of 60% by weight to 90% by weight and a content of the polyethylene terephthalate resin is in a range of 10% by weight to 40% by weight, with respect to a total amount of the polycarbonate resin and the polyethylene terephthalate resin,
wherein the glycidyl group-containing polyethylene copolymer is a polyethylene copolymer which is constituted with a glycidyl group-containing (meth)acrylic acid ester unit and an ethylene unit, in which a content of the glycidyl group-containing (meth)acrylic acid ester unit in the glycidyl group-containing polyethylene copolymer is in a range of 2% by weight to 20% by weight, and has a glass transition point of 0° C. or lower, or is a copolymer obtained by performing graft polymerization of a polymerizable vinyl monomer onto a main chain of the polyethylene copolymer constituted with a glycidyl group-containing (meth)acrylic acid ester unit and an ethylene unit,
wherein an acid value of the polyethylene terephthalate resin is in a range of 10 eq/t to 15 eq/t, and
wherein a content of the organic phosphorus flame retardant is 15% by weight, a content of the flame retardant antidrip agent is 1% by weight, and a content of the antioxidant is 0.2% by weight with respect to 100 parts by weight of a total amount of the polycarbonate resin and the polyethylene terephthalate.

9. The resin composition according to claim 1, wherein a weight average molecular weight of the polycarbonate resin is in a range of 50,000 to 60,000.

10. The resin composition according to claim 9, wherein a terminal hydroxyl group concentration of the polycarbonate resin is in a range of 10 μeq/g to 15 μeq/g.

11. The resin composition according to claim 10, wherein an acid value of the polyethylene terephthalate resin is in a range of 10 eq/t to 15 eq/t.

12. The resin composition according to claim 9, wherein an acid value of the polyethylene terephthalate resin is in a range of 10 eq/t to 15 eq/t.

13. The resin composition according to claim 8, wherein an acid value of the polyethylene terephthalate resin is in a range of 10 eq/t to 15 eq/t.

14. A resin molded article comprising the resin composition according to claim 8.

* * * * *